United States Patent [19]

El-Hamamsy et al.

[11] Patent Number: 4,910,439
[45] Date of Patent: Mar. 20, 1990

[54] LUMINAIRE CONFIGURATION FOR ELECTRODELESS HIGH INTENSITY DISCHARGE LAMP

[75] Inventors: Sayed Amr El-Hamamsy, Schenectady; John M. Anderson, Scotia, both of N.Y.

[73] Assignee: General Electric Company, Schenectady, N.Y.

[21] Appl. No.: 134,498

[22] Filed: Dec. 17, 1987

[51] Int. Cl.$^4$ ............................................. H05B 41/16
[52] U.S. Cl. ..................................... 315/248; 315/344; 315/267; 313/638
[58] Field of Search ............... 315/248, 344, 267, 283, 315/39; 313/638, 25

[56] References Cited

U.S. PATENT DOCUMENTS

| | | | |
|---|---|---|---|
| 3,745,410 | 7/1973 | Fletcher et al. | 315/248 |
| 3,763,392 | 10/1973 | Hollister | 315/248 |
| 3,860,854 | 1/1975 | Hollister | 315/248 |
| 3,942,058 | 3/1976 | Haugsjaa et al. | 313/44 |
| 3,943,403 | 3/1976 | Hougsjaa et al. | 315/248 |
| 3,943,404 | 3/1976 | McNeill et al. | 315/39 |
| 4,048,541 | 9/1977 | Adams et al. | 315/267 |
| 4,070,603 | 1/1978 | Regan et al. | 315/344 |
| 4,180,763 | 12/1979 | Anderson | 315/248 |
| 4,187,445 | 2/1980 | Houston | 315/248 |
| 4,262,233 | 4/1981 | Becker et al. | 315/248 |
| 4,266,167 | 5/1981 | Proud et al. | 315/248 |
| 4,298,828 | 11/1981 | Justice et al. | 315/248 |
| 4,383,203 | 5/1983 | Stanley | 315/248 |
| 4,437,041 | 3/1984 | Roberts | 315/248 |
| 4,581,557 | 4/1986 | Johnson | 313/174 |
| 4,591,759 | 5/1986 | Chalek et al. | 313/638 |
| 4,675,577 | 6/1987 | Hamlet | 315/344 |

OTHER PUBLICATIONS

"The Induction Arc: A State-of-the-Art Review", H. U. Eckert, *High Temperature Science,* No. 6, pp. 99–134, (1974).

"Electrodeless HID Lamp Study: Final Report", J. M. Anderson et al., *Lawrence Berkeley Laboratory, Applied Science Division,* pp. 1–63, (pertinent pp.: 5–10, 47–52, 57–63), (Jan. 1985).

*Primary Examiner*—Leo H. Boudreau
*Assistant Examiner*—Michael Razaui
*Attorney, Agent, or Firm*—Marvin Snyder; James C. Davis, Jr.

[57] ABSTRACT

A high intensity discharge electrodeless lamp having a segmented excitation coil and capacitor configuration offers minimum light obstruction and RF losses while providing maximum impedance matching and heat transfer from the coil to a heat sink. The excitation coil includes at least two pairs of interconnected windings, each pair disposed concentrically in its own plane. The windings are clustered in a toroidal shape, the center of which is positioned to surround the arc envelope of a high intensity discharge lamp containing an ionizable gas activatable by RF energy. The coil windings are of large cross-sectional area and the capacitors have short leads, so as to minimize EMI and power losses and facilitate heat condition to heat sink means. The windings are configured to follow the contours of the magnetic field lines created by current flow through the total coil.

20 Claims, 6 Drawing Sheets

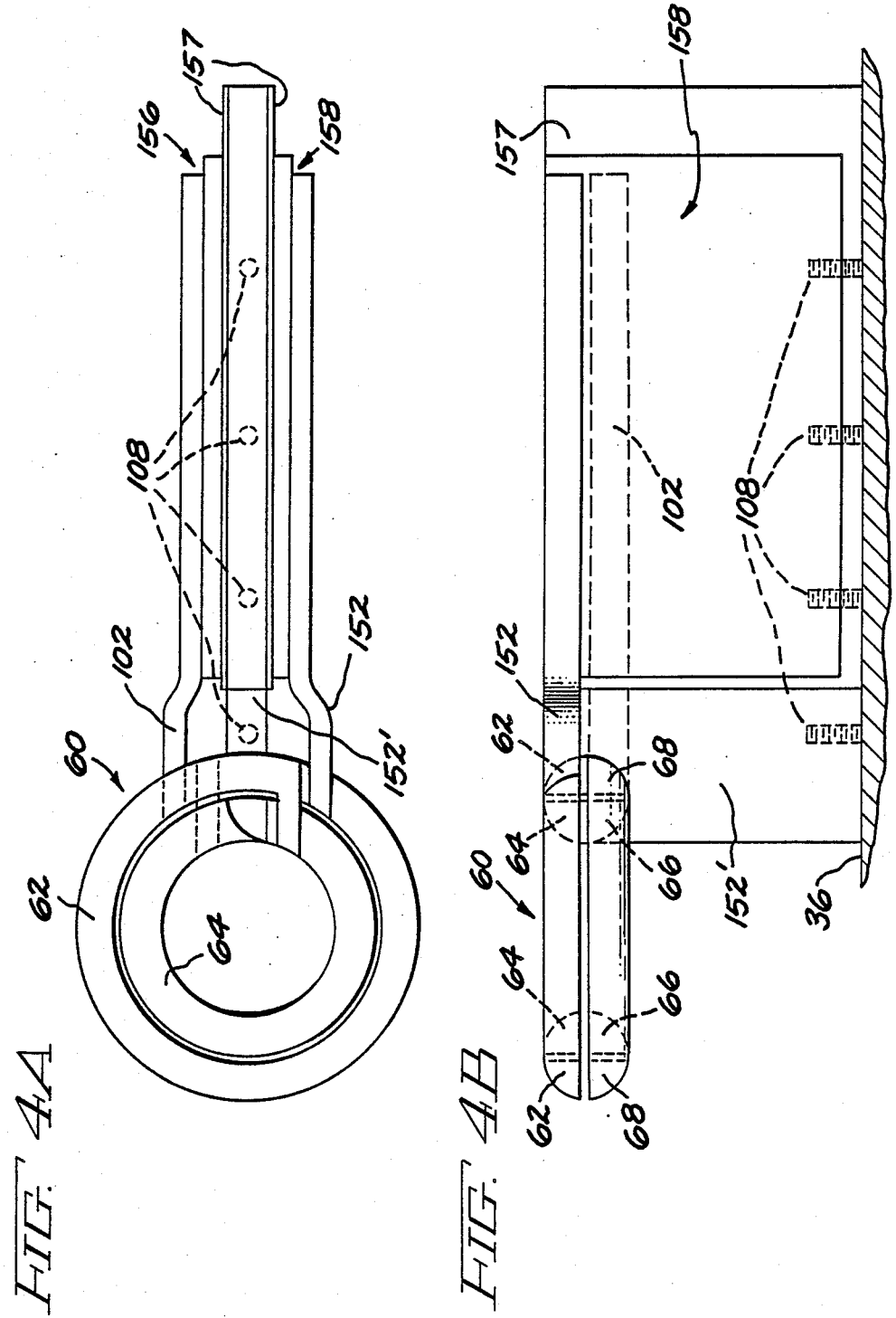

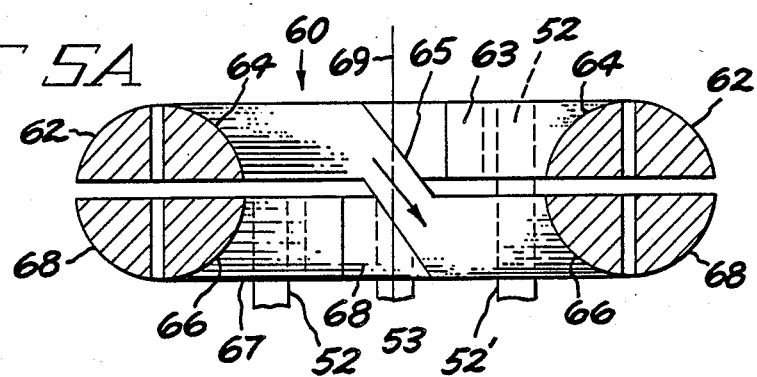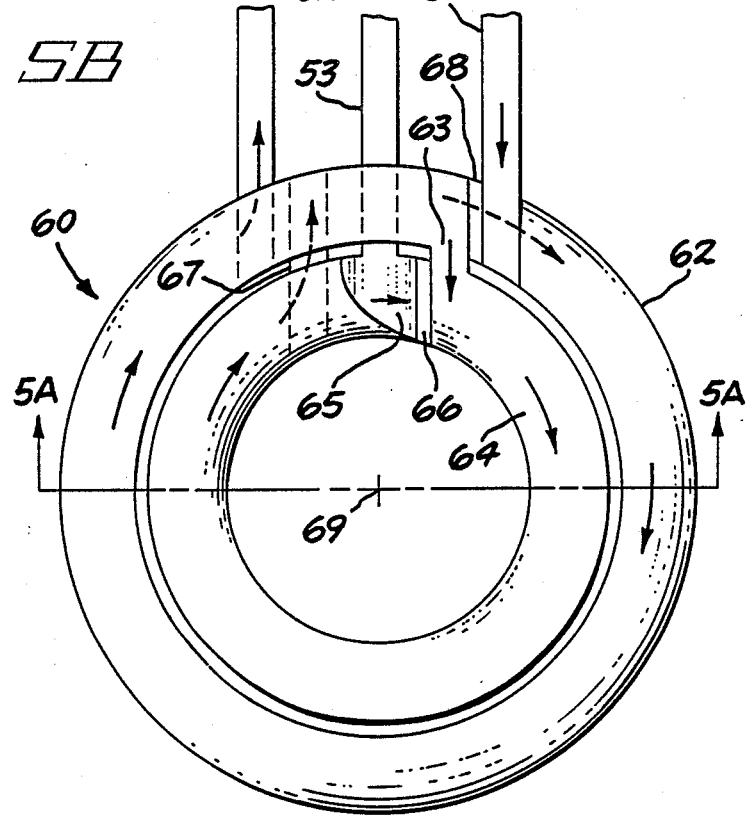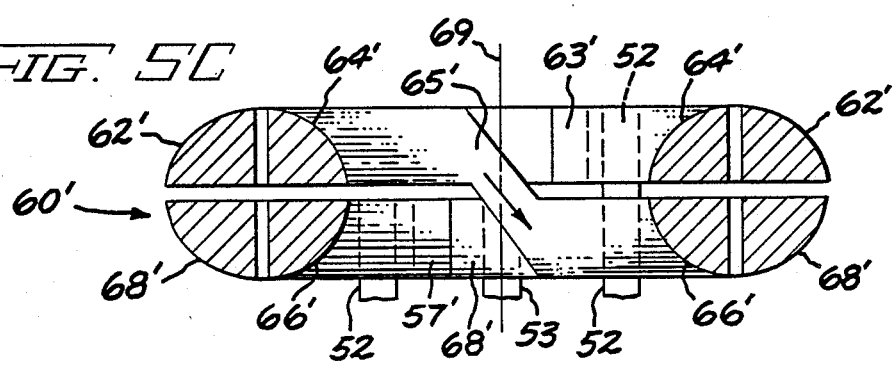

LUMINAIRE CONFIGURATION FOR ELECTRODELESS HIGH INTENSITY DISCHARGE LAMP

BACKGROUND OF THE INVENTION

1. Field of the Invention

This invention relates to electrodeless high intensity discharge lamps for general illumination applications. More particularly, this invention relates to a luminaire including novel geometric structures for the excitation coil of electrodeless high intensity discharge lamps wherein the excitation coil and capacitor plates are placed in close proximity to the lamp envelope with minimum obstruction to escape of useful light and which provide for efficient removal of heat from the coil without water cooling.

2. Technological Background

Electrodeless discharge lamps have been proposed whereby lamps operate using a solenoidal electric field created by an excitation coil. The electric field is substantially circular and closes back on itself. The discharge takes place along the electrical field path and, since it is a closed path, there is no need for electrodes. Such devices are described in U.S. Pat. Nos. 3,500,118 and, 4,180,763, both of which have issued to J. M. Anderson, one of the inventors herein, and both of which are assigned to the assignee of the present invention.

The invention herein relates to a class of electrodeless discharge lamps referred to as high intensity discharge (H.I.D.) lamps such as described for example in my prior U.S. Pat. No. 4,180,763 which is assigned to the assignee of the present invention. The subject matter of U.S. Pat. No. 4,180,763 is hereby incorporated by reference.

High intensity discharge lamps are distinguishable from ordinary fluorescent lamps in that H.I.D. lamps typically operate at a temperature of approximately 700° C. or more and at a vapor pressure of between approximately 200 Torr and approximately one atmosphere. On the other hand, a low intensity discharge lamp, such as that described in U.S. Pat. No. 3,500,118, operates at a temperature of approximately 40° C. and a vapor pressure of approximately 7 microns of mercury. High intensity discharge lamps typically consume a much greater amount of power and yield a correspondingly greater amount of optical output. The amount of power consumed depends in a positive way on the voltage drop along the discharge path.

For a high intensity discharge lamp, there is a typical electric field strength of approximately 10 volts per centimeter. For a more standard, low intensity discharge, the electric field strength is approximately 1 volt per centimeter. The higher power rating requires good coupling between the magnetic field and the electric field driven discharge. In addition, the higher power creates an increased heat energy output which requires a greater amount of heat dissipation and cooling capability than in low intensity discharge lamps. At the same time, improvements made in the coupling and heat sinking must not appreciably interfere with the visible light output of the lamp.

Another electrodeless plasma arc lamp employed as a high intensity light source utilizes an ionizable medium contained in an envelope and a radio frequency (RF) excitation coil immediately surrounding the envelope. This type of device suffers from the drawback that the excitation coil and other elements of the device that surround the envelope tend to impede the escape of light created within the arc envelope, thus decreasing the light emitting efficiency of the lamp.

Other devices propose to couple the input impedance of the excitation coil with the output impedance of a termination fixture, thus matching the impedance of the coil with that of the termination fixture. These devices provide a luminaire structure having long leads to the excitation coil and capacitors connected to the leads for creating an input impedance match. However, because of the parasitic impedance of the lead wires and the losses in the lead wires, the capacitors fail to provide efficient impedance matching.

Electrodeless high intensity discharge lamps suffer from a number of additional problems that must be dealt with. As previously noted, such lamps normally operate at very high temperatures, usually in a range around 700° C. Moreover, the excitation coil usually operates at high temperatures which can range up to as much as 400° C. These temperatures are created by resistive loss due to the large coil electric currents that develop the necessary arc voltage gradient which drives the device. A major practical consideration in the design of such lamps is the removal of excess heat from the coil during operation to limit losses in the coil, to preserve protective coatings and to regard corrosion of the coil material.

Prior art devices have relied on artificial cooling, such as flowing water, to provide for heat removal from the coil. Such cooling means make these devices unwieldy and the bulk associated with the cooling apparatus tends to obstruct the light and other radiation exiting the luminaire. Although water cooling is a viable method of cooling electrodeless H.I.D. lamps, it is impractical for general commercial uses of such lamps. A need exists for a practical method of cooling the excitation coils during the lamp operation.

Another practical consideration in the development of electrodeless H.I.D. lamps is the increased RF power loss in the metal wires of the excitation coil due to the skin effect, especially at the high frequencies in which the coil usually operates. One attempt at a solution to this problem is to design the coil such that it has very low resistance at the frequencies of operation.

In order to reduce the losses in the matching network and the ballast, resonating capacitors are needed directly across the coil. The high currents are thus confined between the resonating capacitors and the coil, thus allowing use of available low cost components in the matching network and the ballast. It has been found, moreover, that in order for the impedance matching to have greatest effectiveness, and in order to reduce the power loss in the connecting wires, the capacitors providing impedance matching should be in as close proximity to the excitation coil as possible. However, placement of the capacitors near the arc envelope tends to obstruct the light generated by the device, thus decreasing the efficiency of the lamp.

SUMMARY OF THE INVENTION

In accordance with the present invention, these and other problems posed by prior art H.I.D. lamp devices are overcome by an electrodeless H.I.D. lamp in a luminaire having excitation coil and capacitor structure in close proximity to the lamp and which provides low RF loss and minimum obstruction to light escape without water cooling. The invention proposes a simple, yet elegant, solution to many problems inherent in the prior art devices.

One object of the present invention is to provide a luminaire for an electrodeless H.I.D. lamp having efficient capability for removing heat from the excitation coil.

Another object of the present invention is to provide a luminaire for an electrodeless H.I.D. lamp having its excitation coil and capacitors in close proximity with minimum light obstruction.

Yet another object of the present invention is to provide an efficient means of light escape from a luminaire for an electrodeless H.I.D. lamp, while simultaneously allowing for efficient heat removal without water cooling.

A still further object of the present invention is to provide a luminaire for an electrodeless H.I.D. lamp which minimizes RF loss due to the excitation coil current.

A feature and distinct advantage of the present invention is that it provides a unique luminaire and excitation coil construction suitable for commercial application. To this end, the cross section of the surface area of excitation coil follows a path along the contour of the net magnetic field lines of the total coil. The number of turns is multiplied by segmenting the coil in cross section. A balanced capacitance arrangement is provided by a structure wherein the electrical leads to the coil further operate as thermal connection to the capacitors and to a heat sink. The capacitor plates are placed in close proximity to the excitation coil so as to operate as a balancing and resonating capacitor network.

In accordance with the foregoing objects and attendant advantages and features of the invention, there is provided a luminaire comprising an electrodeless high intensity discharge lamp including an arc envelope, an excitation coil disposed about the arc envelope, the excitation coil having a first pair of windings disposed substantially concentrically in a first plane and a second pair of windings disposed substantially in a second plane parallel to the first plane, each of the pairs of windings having a transitional portion connecting the windings thereof to each other, a further transitional portion connecting one of the windings of the first pair to one of the windings of the second pair, spacing means for maintaining a separation between each of the coil windings, means coupling the excitation coil to a radio frequency power source, and an ionizable gaseous medium enclosed within the arc envelope for emitting visible wavelength radiation in response to an excitation current traversing the ionizable gaseous medium.

BRIEF DESCRIPTION OF THE DRAWINGS

The objects, features and advantages of the present invention will become more readily apparent in light of the following detailed description when taken in conjunction with reference to the drawings wherein corresponding like elements in the several views are identified by like reference characters.

FIGS. 4A and 4B are respectively top and side elevational views of the coil winding structure of the invention, the coil elements being segmented, together with an alternative embodiment of the capacitor structure;

FIGS. 5A and 5B are top and side elevational views, respectively, of the segmented coil of the invention, with FIG. 5A being a view taken along lines VA—VA of FIG. 5B;

FIG. 5C is a view similar to that of FIG. 5A, illustrating a preferred embodiment of the segmented coil of the invention.

DETAILED DESCRIPTION OF THE INVENTION

Figure 1:
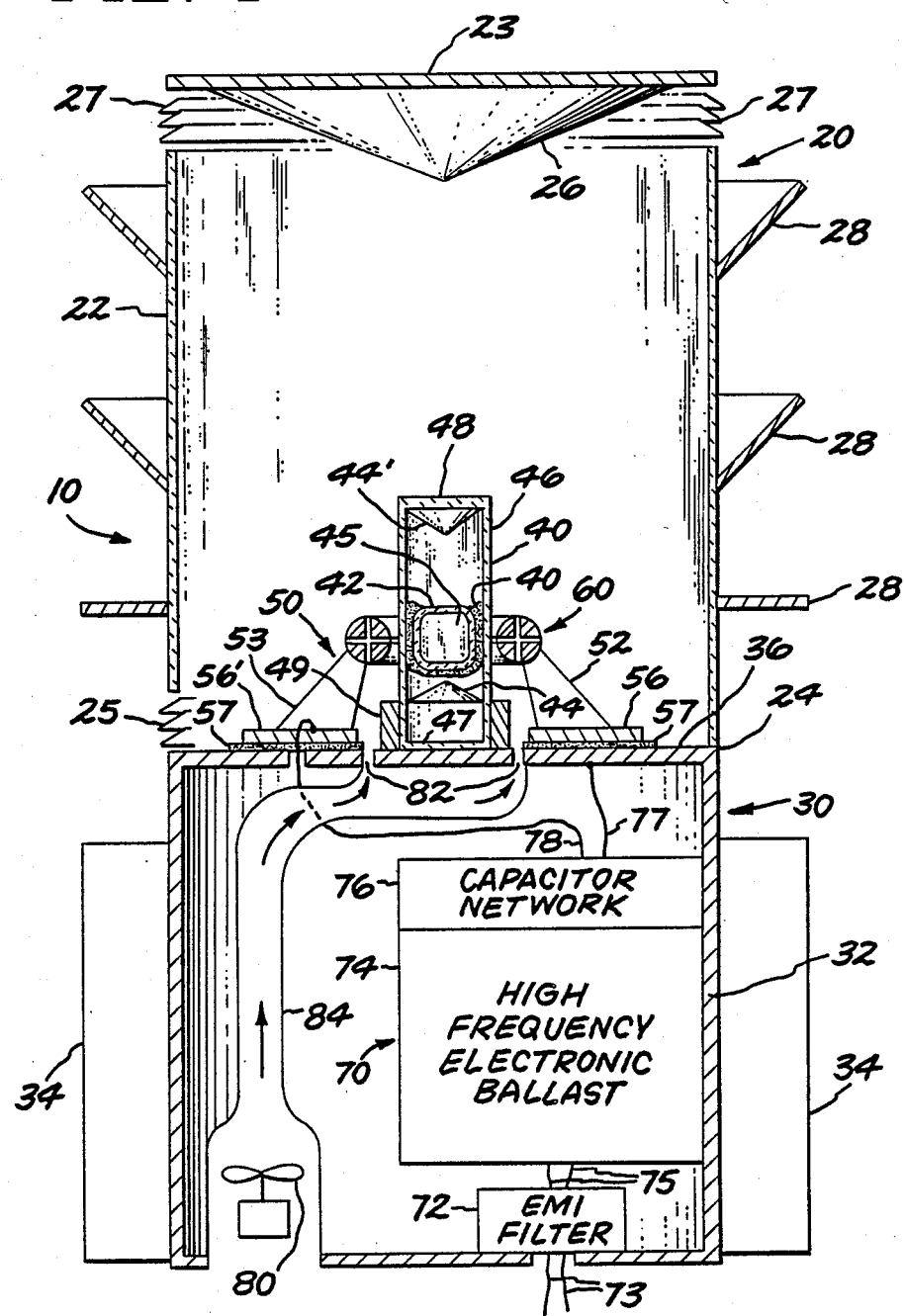
FIG. 1 is a side cross-sectional view of the luminaire including the electrodeless H.I.D. lamp of the present invention.

In FIG. 1, the luminaire, generally shown at 10, comprises two joined portions, a light emitting portion 20 enclosed by a transparent outer encapsulation shell 22 and a thermal heat sink and power source portion 30 enclosed by a ballast shell 32. The outer encapsulation shell 22 houses a number of elements including an electrodeless high intensity arc discharge lamp 40, a capacitor and lead arrangement, generally shown at 50, and excitation coil windings, generally shown at 60. The ballast shell 32 houses an RF generator source, generally shown at 70 and which comprises a high frequency electronic ballast 74 and an impedance matching capacitor network 76, and an optional fan cooling means 80.

The invention is intended for efficiently producing and emitting light in the visible range, originating from the electrodeless high intensity discharge lamp hereinafter described. Light production is generally effected by a high frequency signal in the radio frequency range drawn from RF generator high frequency electronic ballast 74 which receives power from the AC mains 73 through an electromagnetic interference (EMI) filter 72 and leads 75. The RF signal generated in the high frequency electronic ballast 74 may be modified by capacitor network 76 and passed, in turn, to excitation coil 60 and capacitor plates 56, 56' through leads 77, 78. Capacitor plates 56, 56' are isolated from ballast shell 32 by capacitor dielectric 57, 57', respectively, and support elements 52, 52', so that the RF signal traverses the coil windings, as explained below.

In traversing the path of the windings of excitation coil 60, the RF signal creates an inductive field in the space immediately surrounding the coil, and especially within lamp envelope 40 positioned within the coil 60. Lamp envelope 40 has transparent enclosing side walls 46 which together with a base 47 and top 48 enclose and hermetically seal within a vacuum an arc discharge tube 42. Tube 42 may be supported within envelope 40 by, for example, quartz wool 43 therebetween. Sealed within arc discharge tube 42 is a suitable ionizable gas 45. The ionizable gas 45 may be any of a group of known gases, e.g. any of the rare gases, and in particular, xenon, or a combination of gases. For a more detailed description of the arc discharge in electrodeless H.I.D. lamps, reference is made to commonly assigned U.S. Pat. No. 4,187,447, the subject matter of which is hereby incorporated by reference. Within lamp envelope 40, there are also supported arc or light reflectors 44, 44' for reflecting out through lamp envelope 40 the light emitted by the arc. The arc is contained within transparent discharge tube 42 which is depicted in its relative location within envelope 40. Suitable lamp attaching means 49 located at the base of envelope 40 serve to retain and thermally connect lamp envelope 40 to the heat sink and thermal ballast shell surface 36, with the lamp envelope 40 disposed with its central axis vertical as shown in FIG. 1.

Encapsulation shell 22 of light emitting portion 20 is attached to the ballast shell 32 at a junction 24 of the transparent wall 22 and top surface 36 of ballast shell 32 and includes a cover 23 to complete the enclosure for the lamp. Heat radiating fins 34 are attached to the outer surface of ballast shell 32. A reflector 26 depending from cover 23 reflects light, emitted from arc discharge tube 42, in a desired emission pattern outward through transparent wall 22.

Electromagnetic interference (EMI) control fins 28 extending from shell wall 22 control, by containing the magnetic field of coil 60, EMI radiation emanating from the lamp apparatus at the frequency of lamp operation. Inlets 25 and outlets 27 may, if needed, be provided in the wall 22 to provide additional cooling for the lamp apparatus by passing a gaseous stream, such as air, through inlets 25 and outlets 27. Air cooling may be enhanced by air cooling means 80, such as a fan, which forces air into the enclosure of shell 22 through duct 84 and through air passages 82 provided in heat sink surface 36, in the direction of the arrows. Shell 22 may be made from glass, plastic or other suitable transparent material. Fan 80 is optional, and may be driven by a piezoelectric motor, electromagnetic motor or other suitable motor means.

Figure 2:
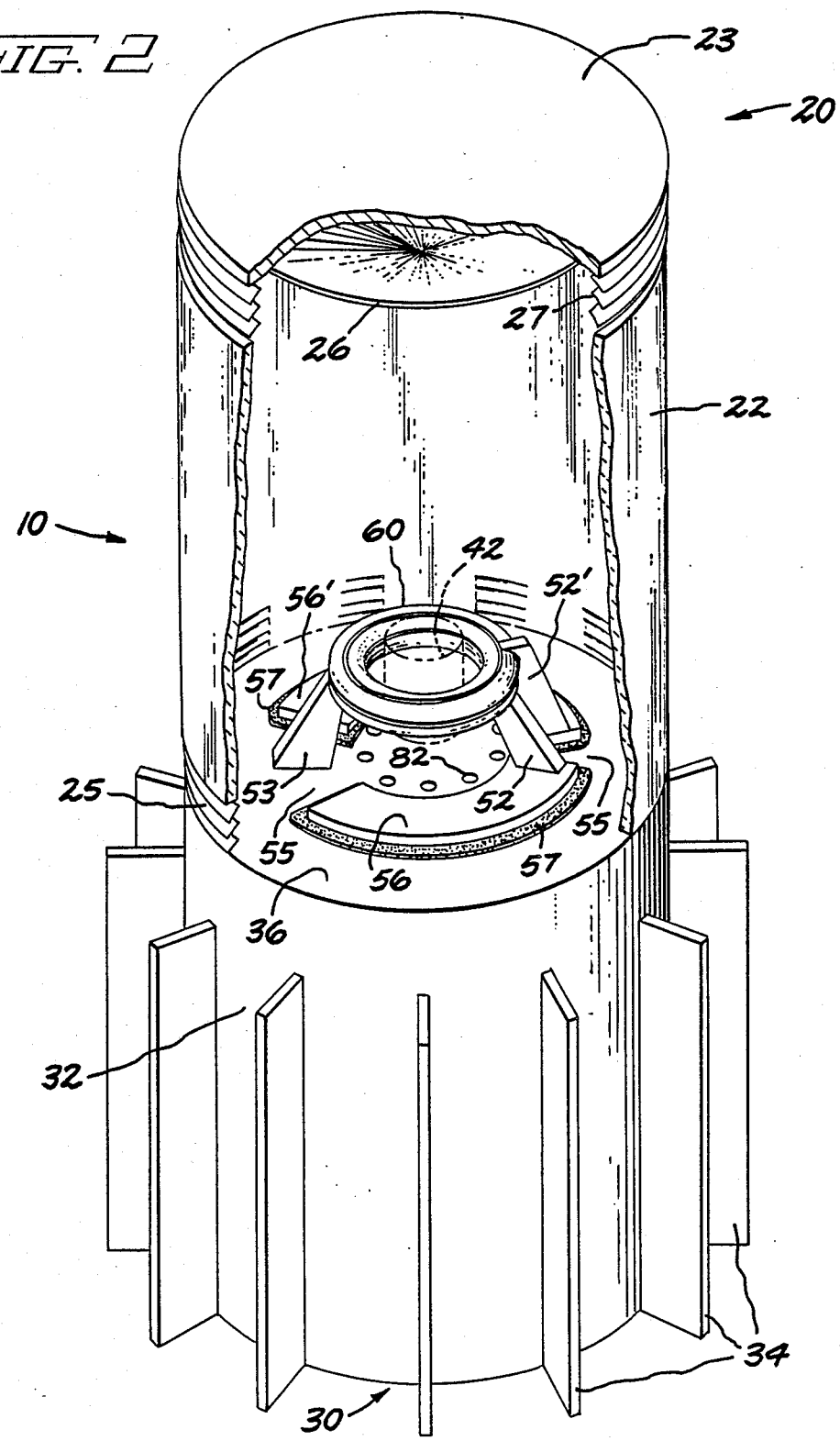
FIG. 2 is a perspective, partially cutaway view of the invention shown in FIG. 1.

FIG. 2 shows the luminaire of FIG. 1 in a perspective, partial cutaway view, showing in more detail one embodiment of the capacitor plates 56, 56' and excitation coil supports 52, 52', according to the invention. For simplicity of illustration, EMI control fins 28, shown in FIG. 1, are omitted in FIG. 2. The upper plate of each of capacitors 56, 56' is planar and curved, each being in the shape of a substantially semi-annular ring. The curved plates of capacitors 56, 56' are separated from the ballast shell surface 36 by a suitable heat conducting dielectric material 57 such as mica, or Teflon synthetic resin polymer. The large surface area of the upper plates of capacitors 56, 56' provides a good thermal energy connection to the ballast shell and heat sink surface 36 which, being a part of ballast shell 30, enables the entire ballast shell 30 to act as a heat sink. Heat radiating fins 34 extending from the sidewall of ballast shell 32 aid in the radiation of excess heat from the apparatus.

The upper plates of capacitors 56, 56' support coil support members 52, 52' which provide an electrical connection between the capacitor plates 56, 56' and the coil structure 60. Further support for coil 60 is provided by one or more elements 53 (only one of which is shown) which also provide both direct electrical connection to coil 60 from ballast shell surface 36 and further heat sinking facility for the coil by furnishing a heat-transmissive connection between the coil and surface 36. Support element 53 is positioned on surface 36 in a break 55 between spaced capacitors 56, 56'. The two principal sources of heat in coil 60 are the RF losses in the metal of the coil and the heat energy received by conduction, convection or radiation from the arc in arc discharge tube 42. Supports 52, 52' and 53, capacitor plates 56, 56' and coil 60 may be made from a suitable material having high heat conducting properties, e.g. a metal such as copper, to serve the dual function of conducting heat and carrying current. The support elements themselves advantageously have thicknesses suitable for facilitating good heat and electrical conduction from the coil 60 to the heat sink plane 36.

The apparatus is advantageously constructed so as to minimize obstruction of the radiation emitted by the arc in lamp envelope 40. The structure shown in FIGS. 3A and 3B is but one embodiment of an optimal balance between conflicting considerations of matching capacitance, efficient heat transfer and minimization of obstruction to light escape.

Figure 3A:
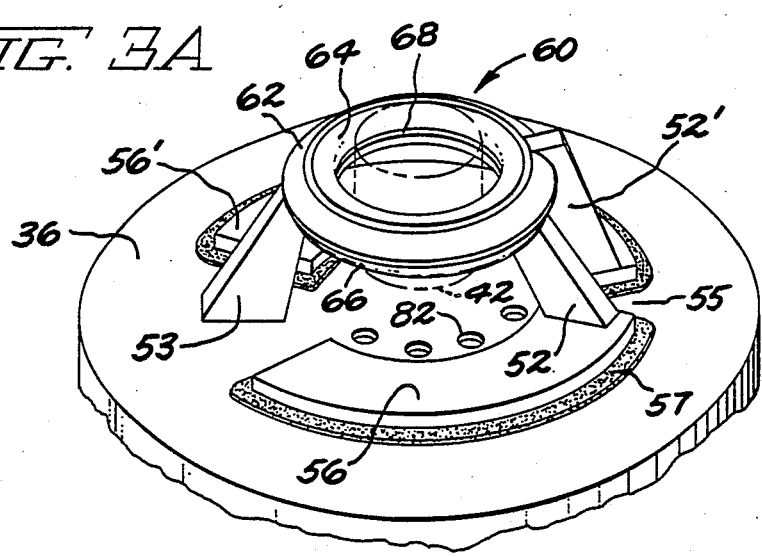
FIG. 3A is a perspective view of the capacitor and coil winding structure according to the present invention.
Figure 3B:
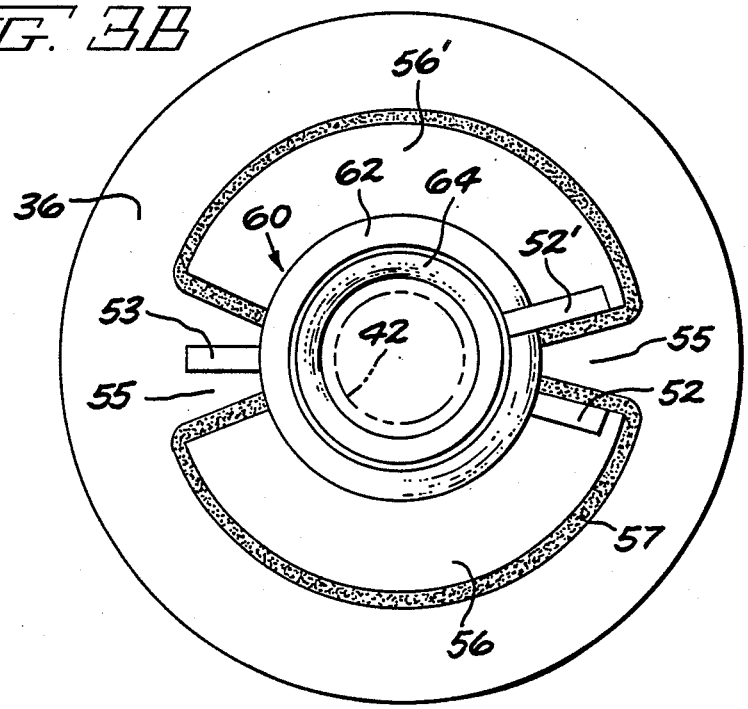
FIG. 3B is a top view thereof.

FIGS. 3A and 3B illustrate, in perspective and top views, respectively, the excitation coil support and capacitor structure according to the invention. Arc tube envelope 42 is outlined in phantom to represent its position when situated in the concentric space defined by excitation coil 60. Coil windings 62, 64, 66, 68 are arranged so as to collectively assume a toroidal shape and are advantageously separated from each other by a sufficiently large distance so as to avoid sparking due to the substantial voltage drop in each successive turn of the windings around the coil. To this end, one of the coil support members 52 provides support for coil winding 66 and another support member 52 provides support for coil winding 62. One or more coil winding support members 53 provide further support to either coil winding 68 or 64, or both, and all support members 52, 52' and 53 are dimensioned to maintain sufficient separation between each individual coil winding and each of the others, as well as between each of the coil windings and the ballast shell heat sink surface 36 and the upper plates of capacitors 56, 56'.

In order to create the large arc voltage gradient necessary to drive an electrodeless H.I.D. lamp, a substantial current in the excitation coil is required. This high intensity current creates excess heat and further contributes to RF loss in the metal wire of the coil. By constructing each of the coil windings with a large cross-sectional area, both the heat generation and RF loss are minimized. A further consideration, however, is that the RF current is mostly conducted at the surface of the coil conductor, the so-called "skin effect", especially at the high frequencies necessary to drive the lamp apparatus. The skin effect tends to decrease the effective cross-sectional area of conductor useable for RF conduction and thereby effectively increases resistance in the coil windings. Thus a balance must be struck in determining the cross-sectional area of each winding conductor, so as to take into account the considerations of skin effect, minimal light obstruction and maximum inductance provided to the arc.

Moreover, the shape of the excitation coil itself is important, in that it has been found that a coil whose cross-sectional contour follows the net magnetic field lines of the total coil substantially reduces the RF losses. This is accomplished by making the total cross section of the coil substantially in the symmetrical shape of a circle or oval, thereby uniformly distributing the RF current across the cross section of the coil turns.

As shown in FIG. 3B, the upper plates of capacitors 56, 56' are spaced from each other and disposed closely adjacent the excitation coil 60. The capacitors formed between each of plates 56, 56' and ballast shell surface 36, provide a matching impedance for the coil. To provide a good thermal link to the heat sink plane of ballast shell surface 36, it is important that the upper plates of capacitors 56, 56' be in heat conductive contact with as much of the area of surface 36 as possible.

FIGS. 4A and 4B are top and side views respectively of the segmented excitation coil winding of the invention, together with an alternative embodiment of capacitor structure. Capacitors 156 and 158 and leads 102 and 152, are disposed in planes parallel to each other and provide thermal contact to the heat sink plane of the ballast shell surface 36 at least at three contact points. Support 152 comprises a strap made of suitable material, such as copper, for making electrical and thermal connection to the windings of coil 60, and specifically connects uppermost outer coil winding 62 to capacitor 158. A copper strap and support 102 is electrically and thermally connected to lowermost outer coil winding 68 (FIG. 4B) and to capacitor 156.

Supports 102, 152 are straps of cross-sectional area on the same order of magnitude as that of coil windings 62, 64, 66, 68. The supports can be brazed or soldered to their respective plates of capacitors 156, 158 over a substantial portion of their surface areas, or they may be integrally manufactured and then brazed or soldered onto the respective coil windings 62, 68 which they support. Moreover, the supports 102, 152 are disposed so that their longitudinal dimensions are almost parallel to the rays of light emitted by the arc envelope (not shown), thus minimizing the amount of light which they obstruct. A support 152' connects the excitation coil 60 electrically and thermally to the ballast shell surface 36 by means of electrically and thermally conductive connections such as threaded screws 108 or posts. Support 152' also acts as a ground plate for capacitors 156, 158, being in a plane parallel to the outer plates of the capacitors and separated from each by a dielectric material 157, thus completing a three-lead electrical configuration as discussed in the specification relating to FIG. 6C below.

FIGS. 5A and 5B are side and top elevational views, respectively, providing a detailed representation of the excitation coil windings according to the invention. These figures illustrate additional details concerning the connections between coil windings 62, 64, 66, 68 and the support structure leads associated therewith, as well as the connections between successive individual windings themselves. As shown in FIGS. 5A and 5B, four individual windings 62, 64, 66 and 68 are grouped to form a segmented, substantially toroidally shaped excitation coil 60 having four turns. The particular configuration illustrated in FIGS. 5A and 5B may be utilized in either of the two previous embodiments disclosed, with the connections referenced 52, 53 and 52', respectively, in FIGS. 5A and 5B equally representing connections 102, 152 and 152', respectively, in FIGS. 4A and 4B. An important aspect of the configuration is the substantially toroidal shape of the total coil since the contours of the coil windings must follow a path closest to the magnetic field lines of the total coil. The number of windings may be one or more, up to any number which is commercially practical. Although four turns are illustrated in this embodiment, it will be understood that any number of turns is possible within the consideration of practical manufacture, as well as optimal thickness and electrical conducting properties. However, four coil windings appear to be optimal from the standpoint of providing a high number of windings, each having a cross-sectional area with sufficient capacity to carry the large electrical current necessary to operate the device, and also sufficient for carrying that current in the connections joining each separate coil winding to the electrical leads 52, 53 and 52' (or 102, 152 and 152', in FIGS. 4A and 4B) and to each successive winding.

Windings 62 and 64 are disposed in a first plane and each is in the form of a concentric annular segment with a common axis 69. Likewise, windings 66 and 68 are disposed in a second plane and each is in the form of a concentric annular segment with a common axis 69. The windings of the first plane are disposed directly above, and are physically separated from, the windings of the second plane, with connections between the windings in different planes being established through transitional segment 65. FIG. 5A illustrates the manner in which transitional segment 65 establishes a connection between the windings of the first plane and the windings of the second plane parallel to, and spaced from, the first plane.

Transitional segment 65 is connected between one end of coil winding 64 and one end of coil winding 66 which circularly traverses the excitation coil path immediately below coil winding 64. Coil winding 66 is in turn connected to coil winding 68 by transitional segment 67. Windings 66 and 68 are concentric and in the same plane. Thus there is no need for transitional segment 67 to extend between planes, and the connection between windings 66 and 68 is made in the plane of the windings 66, 68 via segment 67. In similar manner, transitional segment 63 connects windings 62 and 64 in the plane of windings 62 and 64. The windings are thereby connected so that the electromagnetic fields generated by each of the respective individual windings are additive.

In operation, a radio frequency signal at a suitable frequency, preferably in the range of 0.1–20 megahertz (MHz) is applied to coil 60 through supports 52, 53 and 52' (or through supports 102, 152' and 152 shown in FIGS. 4A and 4B). The RF signal will traverse each of the coil windings in the same direction, such as in the direction of the arrows in FIG. 5B, and then in the reverse direction through all windings when the signal reverses polarity. It should be appreciated and recognized that FIGS. 5A and 5B are illustrative only, and other excitation coil configurations are possible, such as shown in FIGS. 4A and 4B wherein a secondary connection is made by virtue of the third support 152' for the coil, or, alternatively, by employing other connections (not shown) between the coils.

RF loss is maintained at its lowest possible value when it is as uniformly distributed across the conductor cross section of the coil windings as the skin effect will permit. Because the RF current travels only along the conductor surface of the coil windings, RF loss is minimized by maximizing the coil surface area in contact with the RF magnetic field. It has also be determined by modeling studies that the best cross section of the segmented toroidal shaped excitation coil of the invention is one where the inside coil windings 64 and 66 have a smaller cross-sectional area than the outside coil windings 62 and 68. Thus, the optimal cross-sectional structure of the coil configuration is one where the four separate coil windings form an ovate shape 60', as shown in FIG. 5C. Such an ovate shape would appear in cross section as an egg with a more pointed profile formed by windings 64', 66', on the inside of the toroidal shaped total coil 60', and a less rounded profile formed by windings 62', 68' at the outside of the toroidal shape 60'. Thus, in comparison with the cross-sectional area shown in FIG. 5A, the cross-sectional areas of the coil windings 64' and 66' would be somewhat smaller than those of windings 64 and 66, and the cross-sectional areas of coil windings 62' and 68' would be somewhat larger than those of windings 62 and 68.

Figure 6A:
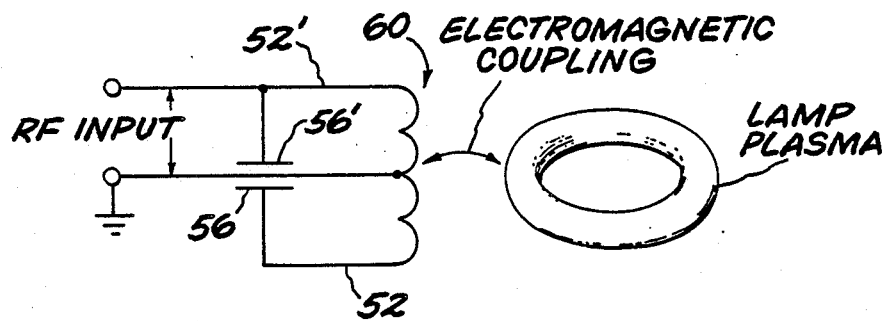
FIGS. 6A through 6C are schematic diagrams of the electrical structure of the capacitor and coil windings according to the present invention.
Figure 6B:
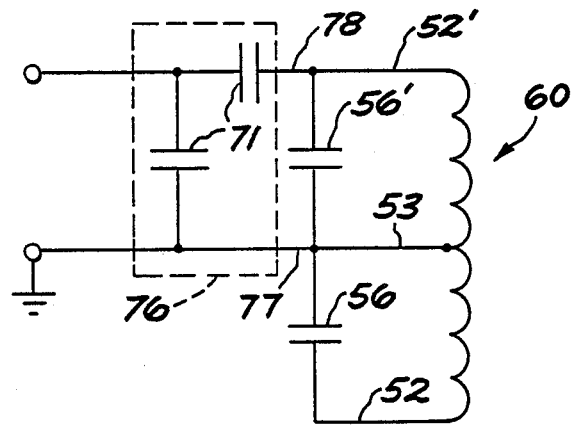
Figure 6C:
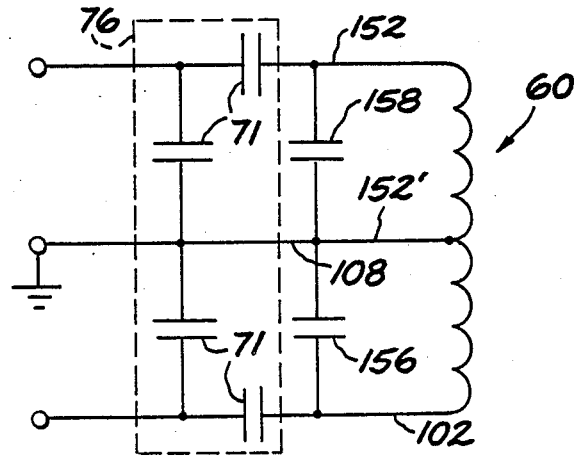

In FIGS. 6A–6C, schematic diagrams of different possible electrical connections are shown by way of example. FIG. 6A illustrates the basic parallel connection of capacitors 56, 56' across respective halves of coil 60, with one half (e.g., the two upper windings) of the coil connected directly across the RF input lines and the other half (e.g., the two lower windings) acting as the secondary of an autotransformer, together with the electromagnetic coupling between coil 60 and the lamp plasma within the arc tube of the H.I.D. lamp (not shown). FIGS. 6B and 6C further illustrate the use of capacitors 71 in the impedance matching network 76 of FIG. 1. For example, in FIG. 6B, an "L" bridge of capacitors 71 is connected across the input lines. The "L" bridge serves to adjust the impedance level so as to match the output impedance of ballast 74, shown in FIG. 1. Generally, the basic coil 60 and capacitors 56, 56' or 156, 158 (FIGS. 4A and 4B) are selected to self-resonate at a frequency a little above the operating frequency, while capacitors 71 provide the additional capacity to produce resonance at the operating frequency. In the circuit of FIG. 6C, which is fully balanced, a three-lead connection to coil 60 as utilized in the embodiment of FIGS. 4A and 4B is impedance-matched by two "L" bridges of capacitors 71. At least one advantage derived in causing most of the resonance to occur in the basic coil 60 and capacitors 56, 56', as in FIG. 6B or capacitors 156, 158, as in FIG. 6C, is that the tank circuit current is confined to a low RF loss structure, and only a low current flows in the impedance matching network 76 (which is of higher impedance).

Although the present invention has been discussed and described with primary emphasis on preferred embodiments, it should be understood that various modifications can be made in the design and operation of the present invention without departing from the spirit and scope thereof. The embodiments disclosed are therefore to be considered in all respects as illustrative and not restrictive of the invention, the scope of the invention being indicated by the following claims rather than by the foregoing description, and all changes which come within the meaning and range of the equivalency of the claims are therefore to be embraced therein.

What is claimed is:

1. A luminaire for electrodeless high intensity discharge lamp comprising:
   (a) an excitation coil including a first pair of windings disposed substantially concentrically in a first plane, a second pair of windings disposed substantially concentrically in a second plane parallel to said first plane, each of said pairs of windings including a first transitional portion connecting the windings of the pair, and a further transitional portion connecting one of the windings of the first pair to one of the windings of the second pair such that all of said windings are connected in series, said coil including a central opening therein for accepting arc envelope means containing an ionizable medium therein adapted to be ionized in response to a radio frequency signal in said excitation coil so as to emit electromagnetic radiation in the visible wavelength range;
   (b) spacing means for spacing said excitation coil windings from each other, so that the surfaces of each coil do not come into contact with each other; and
   (c) coupling means for coupling the excitation coil to a radio frequency power source.

2. The luminaire according to claim 1 including a pair of capacitors, each of said capacitors, respectively, being connected to a separate one, respectively, of said pairs of windings.

3. The luminaire according to claim 2 wherein each of said capacitors, respectively, includes a capacitor plate, respectively, in the shape of a substantially semi-annular planar ring disposed in a third plane spaced from said excitation coil windings, said lamp including support means holding said coil windings in place at a distance from said windings and furnishing the connections between said capacitors and said pairs of windings.

4. The luminaire according to claim 1 wherein said first and second pairs of windings are positioned so as to collectively assume a substantially toroidal shape.

5. The luminaire according to claim 4 wherein said first and second pairs of windings are positioned so as to collectively assume a segmented ovate shape in cross section.

6. The luminaire according to claim 5 wherein each of said pairs of windings comprises an inside and an outside winding, the inside winding of each pair having a smaller cross-sectional area than the cross-sectional area of said outside winding of said each pair.

7. The luminaire according to claim 2 wherein each of said capacitors comprises a pair of conductive plates in the shape of flat members disposed opposite each other in parallel planes that are perpendicular to said first and second planes.

8. The luminaire according to claim 1 wherein said spacing means comprises two supports, each of said two supports, respectively, being mechanically connected to a separate one of said pairs of windings, respectively, and a third support connected to the electrical midpoint of said windings, whereby said supports maintain said first and second pairs of windings rigidly in said first and second planes, respectively.

9. The luminaire according to claim 8 wherein each of said two supports is electrically conductive and provides electrical connection for each of said pairs of windings, respectively, to said coupling means.

10. The luminaire according to claim 8 wherein said supports are thermally conductive and comprise heat sinks for removing excess heat from said excitation coil.

11. The luminaire according to claim 1 including heat sink means, said spacing means comprising thermally conductive connections to said heat sink means for removal of heat from the luminaire.

12. The luminaire according to claim 11 wherein said heat sink means comprises a shell having heat radiating fins extending therefrom.

13. The luminaire according to claim 1 further comprising a transparent outer encapsulation means including cooling means for subjecting said excitation coil to a gaseous stream for cooling said coil.

14. The luminaire according to claim 13 wherein said cooling means comprises an air inlet and an air outlet in said transparent outer encapsulation means.

15. The luminaire according to claim 14 wherein said cooling means further comprises a fan for forcing air over the surface of said excitation coil windings.

16. The luminaire according to claim 1 further including shell means for enclosing said coil and said arc envelope means, and optical reflectors supported within said shell means for directing the radiation emitted from the arc envelope in a desired emission pattern, said shell means being optically transparent at least in a region to pass said emission pattern out of said shell means.

17. An excitation coil for an electrodeless high intensity discharge lamp comprising:
   (a) a first pair of windings disposed substantially concentrically in a first plane;
   (b) a second pair of windings disposed substantially concentrically in a second plane parallel to said first plane;
   (c) each of said pairs of windings including a transitional portion, respectively, interconnecting the windings of the respective pair;
   (d) a further transitional portion connecting one of the windings of the first pair to one of the windings of the second pair; and
   (e) electrically conductive support means connected to each of said pair of windings for supporting said first pair of windings in a spaced relationship with said second pair of windings and for providing electrical power to said coil.

18. The excitation coil for an electrodeless high intensity discharge lamp of claim 17 wherein said first and second pairs of windings are positioned so as to collectively assume a substantially toroidal shape.

19. The excitation coil for an electrodeless lamp of claim 18 wherein said windings of each pair are positioned in relation to each other so as to collectively assume the shape of a segmented ovate cluster in cross section.

20. The excitation coil for an electrodeless high intensity discharge lamp of claim 17 wherein the winding connections made by each of said transitional portions are arranged such that electromagnetic fields generated by current in the respective individual windings of the first and second pairs are additive.

* * * * *